United States Patent [19]

Haines

[11] Patent Number: 5,393,232

[45] Date of Patent: Feb. 28, 1995

[54] VISUAL AID SYSTEM

[76] Inventor: William C. Haines, 1267 Greybrooke Pl., Oldsmar, Fla. 34677

[21] Appl. No.: 153,073

[22] Filed: Nov. 15, 1993

[51] Int. Cl.⁶ .............................................. B43L 1/00
[52] U.S. Cl. ..................................... 434/415; 434/421; 434/430
[58] Field of Search ............... 434/415, 408, 421, 430; 40/600, 621

[56] References Cited

U.S. PATENT DOCUMENTS

| | | |
|---|---|---|
| 641,683 | 1/1900 | Evans . |
| 1,168,949 | 1/1916 | McKittrick et al. .............. 40/621 X |
| 2,600,505 | 6/1952 | Jones . |
| 2,816,380 | 12/1957 | Sindell .............................. 434/430 X |
| 3,150,296 | 9/1964 | McIntosh . |
| 3,336,682 | 8/1967 | Genin . |
| 4,060,246 | 11/1977 | Ward . |
| 4,584,223 | 4/1986 | Krapf .............................. 434/430 X |
| 4,717,109 | 1/1988 | Johnston ............................ 248/441.1 |
| 5,295,342 | 3/1994 | Roche et al. ............................ 52/764 |

*Primary Examiner*—Gene Mancene
*Assistant Examiner*—Jeffrey A. Smith
*Attorney, Agent, or Firm*—Harold D. Shall

[57] ABSTRACT

A visual aid system including a plasticized fabric covered fiberboard magnetic panel with the fiberboard having vertically extending and horizontally spaced strip magnets imbedded in the surface thereof and being secured at its rear surface to a supporting wall. A display panel made or porcelain enameled steel is magnetically attached to the magnetic panel. A tack panel is carried to the supporting wall and a cork panel is disposed between and is carried by said magnetic panel and said tack panel.

4 Claims, 2 Drawing Sheets

VISUAL AID SYSTEM

BACKGROUND OF THE INVENTION

1. Field of the Invention

This invention relates to visual aid systems generally and more particularly to a panel with magnets imbedded therein and covered with a plasticized fabric material which panel is also tackable and has adjustably and magnetically secured thereto a double sided steel reversible marking surface and has carried thereby a tackable panel for display purposes.

2. Description of the Prior Art

Patents such as U.S. Pat. No. 404,389 issued Jun. 4, 1889 to A. J. Douglas, U.S. Pat. No. 641,683 issued Jan. 23, 1900 to C. A. Evans, U.S. Pat. No. 1,168,949 issued Jan. 18, 1916 to G. McKittrick et al, U.S. Pat. No. 2,600,505 issued Jun. 17, 1952 to M. H. Jones, U.S. Pat. No. 3,043,023 issued Jul. 10, 1962 to A. D. Colpo, U.S. Pat. No. 3,150,296 issued Sep. 22, 1964 to J. McIntosh, U.S. Pat. No. 3,336,682 issued Aug. 22, 1967 to R. I. Genin, U.S. Pat. No. 4,100,684 issued Jul. 18, 1978 to S. Berger, U.S. Pat. No. 4,717,109 issued Jan. 5, 1988 to W. Johnston, and U.S. Pat. No. 4,796,847 issued Jan. 10, 1989 to M. Kayner, relate to display boards and devices with and without magnets. However, none of these patents discloses a device within the field of this invention as described herein or as claimed hereinafter.

SUMMARY OF THE INVENTION

The present invention is a visual aid systems which includes a magnetic panel which is a plasticized fabric covered mineral fiberboard with the back of the fiberboard bonded to a supporting wall and the front of the fiberboard, within the fabric, having permanent rubber barium ferrite composite magnets imbedded into its surface. The fabric coated surface is tackable for display purposes. Magnetically secured to the magnetic panel is a display which is of double sided steel construction which can be reversed and, therefore, capable of being marked on both sides. The display panel may be moved up or down and endwise on the magnetic panel to accommodate users of various heights. A magnet carrying tray is magnetically attachable to the front of the display panel for supporting markers of various types. A tack panel, which is of the same construction as the magnetic panel but without the magnets, is secured to the top of the magnetic panel and serves as a tacking surface for display purposes. Between the magnetic panel and the tack panel is secured a cork panel for displaying maps or the like.

DETAILED DESCRIPTION

Figure 1:
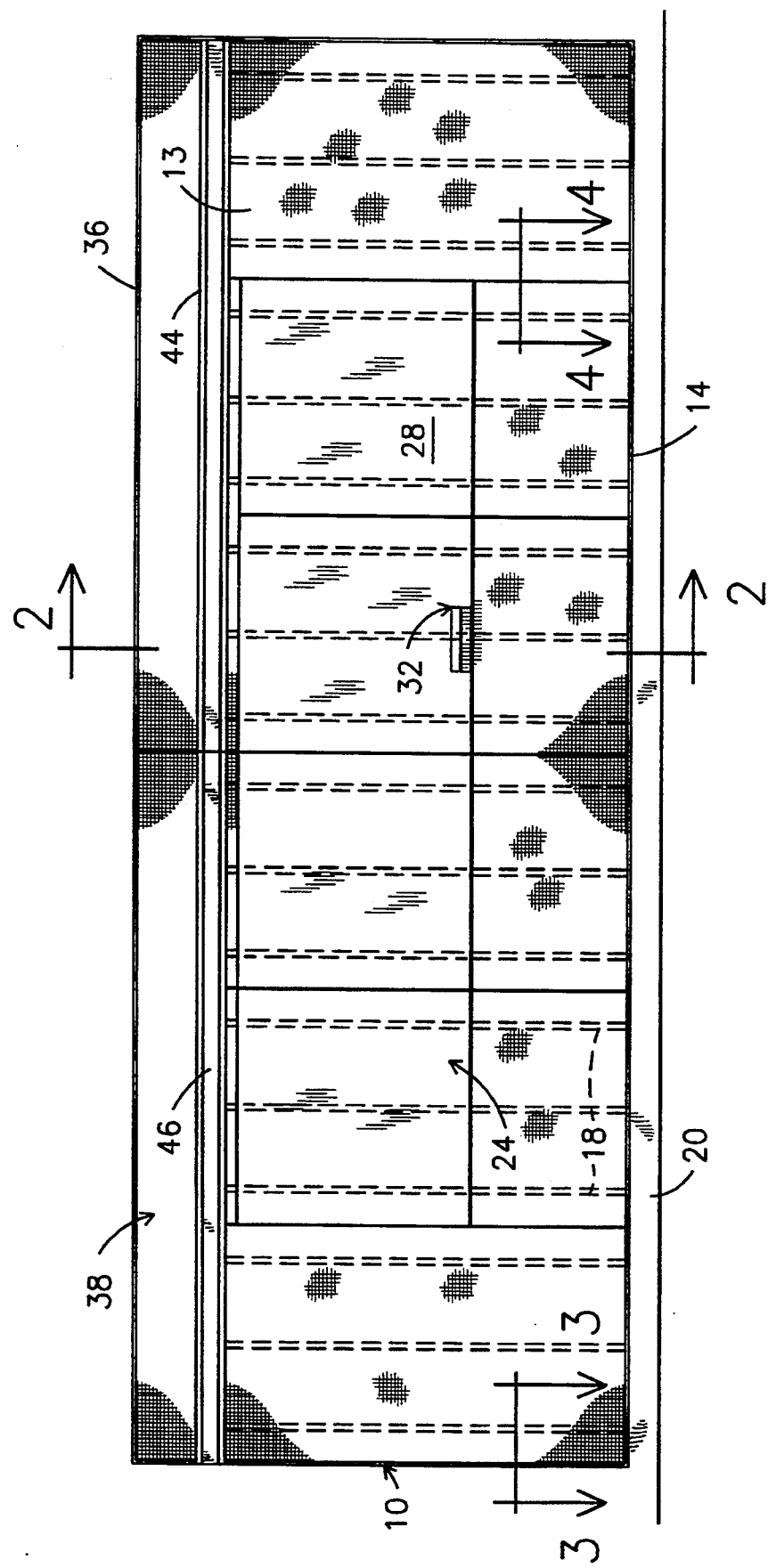
FIG. 1 is a front and elevational view of the display panel of this invention.
Figure 2:
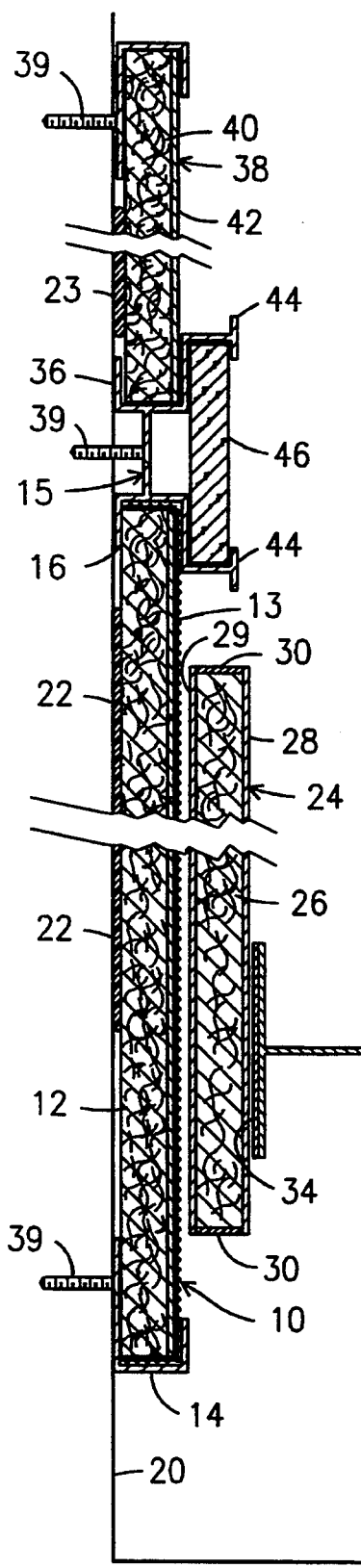
FIG. 2 is an enlarged cross sectional view taken along line 2—2 in FIG. 1.
Figure 3:
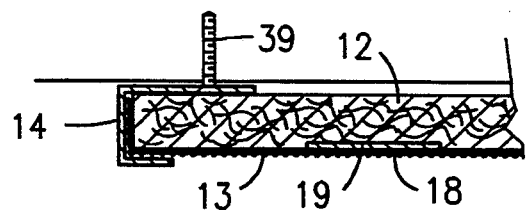
FIG. 3 is an enlarged cross sectional view taken along the line 3—3 in FIG. 1.
Figure 4:
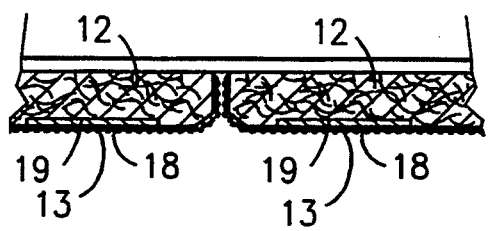
FIG. 4 is an enlarged cross sectional view taken along the line 4—4 in FIG. 1.

Referring now to the drawings, a magnetic panel is shown generally at 10 and comprises a plurality of sheets of fiberboard 12 having bondingly secured to the front, top and ends thereof a cover of plasticized fabric 13, such as commercial grade vinyl impregnated wall covering. Encasing the bottom and the opposed ends of the plurality of fabric covered fiberboard is aluminum J-trim 14. The top of the sheets fiberboard is encased in a complex shaped trim member 15, the bottom portion 16 of which is shaped like J-trim. Imbedded within the fiberboard panels 12 are a plurality permanent magnets 18 of the rubber barium ferrite composite type. The magnets 18 are in vertical strips which extend from the horizontally top to the bottom of the panels 12 and are spaced horizontally therealong at suitable increments, such as, sixteen inch centers. The magnets 18 are glued into mating grooves 19 in the fiberboard panels 12 and are flush with the surface of the fiberboard. The vinyl fabric covered fiberboard panels with the surrounding J-trim form the magnetic panel 10 which is secured to a supporting structure, such as a wall 20, by adhesive bonding material 22. The fabric coated fiberboard panels 10 are tackable in the event the user desires to tack something thereto.

Magnetically and movably carried by the panel 10 is a display board 24 which has a core 26 of fiberboard or honeycomb cardboard which is covered on the front and back by a skin of porcelain enameled steel 28 and 29 respectively. More than one display board may be used. The top and bottom and both ends of the display board 24 are covered with a band of aluminum edge banding 30. The display board 24 is not only movable vertically and horizontally, but can also be reversed so that either the steel surface 28 or 29 is exposed and capable of being marked thereon with a marker or chalk.

Magnetically carried by the display board 24 is a tray 32 upon which may be placed a marker when same is not in use. The tray 32 has a magnetic strip 34 bonded thereto which magnetically attaches the tray 32 to the display board 24 at any desired location.

The top portion 36 of the complex shaped trim member 15 is also shaped like J-trim, and such top portion 36 extends completely around and supports a tack panel shown generally at 38. The tack panel 38 has fiberboard core 40 and a cover 42 of plasticized fabric such as commercial grade vinyl impregnated wall covering, which cover extends over the front and ends of the panel. The tack panel 38 is secured at its back to the wall 20 by adhesive 23 and serves as a tacking surface for display purposes.

Extending from the front of the J-trim members 16 and 36 of the complexly shaped trim member 15 are a pair of spaced inturned legs 44 and supported within the legs 44 is panel 46 made of cork which cork panel 46 serves as a convenient location for securing maps and the like. The J-trim member 14, the trim member 15 and the J-trim member 36 are secured to the wall 20 by a plurality of screws 39.

Although the above description relates to a presently preferred embodiment, numerous changes can be made therein without departing from the scope of this invention as claimed in the following claims.

What is claimed is:

1. A visual aid system carried by a supporting wall comprising in combination,
   (a) a panel made of fiberboard,
   (b) a plurality of vertically extending horizontally spaced magnets with said magnets being embedded in said fiberboard and flush with a surface thereof,
   (c) a cover on the front of said fiberboard made of plasticized fabric, (d) means securing said fiberboard to the supporting wall,
(e) a display panel having a core and front and back surfaces and with said front and back surfaces being made of porcelain enameled steel,
(f) said display panel being magnetically carried by said fiberboard panel.

2. A visual aid system according to claim 1 including a tack panel, securing means connecting said tack panel to said fiberboard panel, means securing said tack panel to the supporting wall, and a cover on the front surface of said tack panel made of plasticized fabric.

3. A visual aid systems according to claim 2 including a cork panel disposed between said fiberboard panel and said tack panel and being carried by said fiberboard panel.

4. A visual aid system according to claim 1 including a tray for carrying markers thereon and a magnetic strip on a rear portion of said tray for magnetically attaching said tray to said display panel at a desired location.

* * * * *